(12) United States Patent
Hishikawa et al.

(10) Patent No.: US 7,915,851 B2
(45) Date of Patent: Mar. 29, 2011

(54) NUMERICAL CONTROLLER CONTROLLING ACCELERATION AND DECELERATION OF RESPECTIVE CONTROL AXES UP TO COMMAND SPEEDS

(75) Inventors: Tetsuo Hishikawa, Yamanashi (JP); Takashi Idei, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 367 days.

(21) Appl. No.: 12/144,107

(22) Filed: Jun. 23, 2008

(65) Prior Publication Data

US 2009/0009126 A1 Jan. 8, 2009

(30) Foreign Application Priority Data

Jul. 2, 2007 (JP) ................................. 2007-174349

(51) Int. Cl.
*G05B 11/32* (2006.01)
(52) U.S. Cl. .......................... 318/625; 318/567; 318/569
(58) Field of Classification Search .................. 318/625, 318/567, 569, 802, 34, 560
See application file for complete search history.

(56) References Cited

U.S. PATENT DOCUMENTS

2005/0151503 A1* 7/2005 Yaeshima et al. ............. 318/802
2007/0145931 A1 6/2007 Onishi et al.

FOREIGN PATENT DOCUMENTS

JP 2007-172394 7/2007

* cited by examiner

*Primary Examiner* — Karen Masih
(74) *Attorney, Agent, or Firm* — Drinker Biddle & Reath LLP

(57) ABSTRACT

Initial speeds in the move commands for respective control axes at servo-on are determined according to parameter setting, or the comparative relationship or difference in speed among the actual speeds of the control axes so that difference in position between the control axes does not increase as the move commands are executed after the servo-on. The actual speeds of the control axes are set as initial speeds in the move commands, and a target axis is specified on the basis of the comparative relationship among their actual speeds and the other control axes are accelerated or decelerated at the acceleration or deceleration rate specified in the move commands to attain the position and speed of the target axis, so that differences in position and speed among the control axes are gradually decreased as the move commands are executed after the servo-on, thereby preventing abrupt speed changes and suppressing mechanical shocks.

7 Claims, 16 Drawing Sheets

(X = START ADDRESS OF MOVEMENT COMMAND SIGNAL)

| Offset | Field |
|---|---|
| X+00 | FUNCTION NUMBER |
| +02 | DATA LENGTH |
| +04 | FEED TYPE (RAPID TRAVERSE / CUTTING FEED / CONTINUOUS FEED) |
| +06 | REFERENCE AXIS NUMBER |
| +08 | FEED SPEED |
| +12 | ACCELERATION RATE |
| +16 | DECELERATION RATE |
| +20 | OPERATION TYPE (ABSOLUTE/INCREMENTAL) |
| +22 | AXIS CONTROL DATA (COORDINATE VALUES / AMOUNT OF MOVEMENT) |

NUMERICAL CONTROLLER CONTROLLING ACCELERATION AND DECELERATION OF RESPECTIVE CONTROL AXES UP TO COMMAND SPEEDS

BACKGROUND OF THE INVENTION

1. Field of the Invention

The present invention relates to a numerical controller for controlling the positions of servomotors or the positions of control axes controllably driven by the servomotors, and in particular to a numerical controller that initiates positional control in a novel way by supplying current to the servomotors in a state in which no current is supplied to the servomotors and the servomotors (movable parts) are coasting.

2. Description of the Related Art

In die casting machines, pressing machines, and other machines in which servomotors are used to drive movable molds (control axes) to open and close the molds, a large force is required to open the molds, so it is known that current is not supplied to the servomotors (this state will be referred to hereinafter as "servo-off") and workpieces and the movable molds are ejected from the stationary molds by a hydraulic pressure or the like, and current is then supplied to the servomotors (this state will be referred to hereinafter as "servo-on") to control the positions of the movable molds (control axes) that are coasting after the molds are opened.

A numerical controller that smoothly starts issuing move commands by setting the actual speed of an axis coasting in the servo-off state at the point in time the servo-off state is released and switched to the servo-on state as an initial speed of move command in positional control is proposed in a Japanese Patent Application (Serial No. JP2005-370821) and published on Jul. 15, 2007, as JP 2007-172394, A).

In die casting machines and pressing machines having large movable parts, synchronous control is adopted to control the activation of the large movable parts using two or more servomotors. In this case, when the workpiece and movable mold are ejected from the stationary mold with a hydraulic pressure or the like, the ejected points may slightly be displaced and the ejecting force may not be transmitted evenly to the two or more servomotors.

In the above Japanese patent application, when a plurality of servomotors are connected and operated synchronously in the numerical controller in which move commands are initiated when the servomotors, ejected by an external force and coasting in the servo-off state, are switched to the servo-on state, the actual speeds of the control axes at servo-on state are set as the initial speeds and identical move commands are subsequently initiated.

When a plurality of servomotors are connected and operated synchronously, setting the actual speeds at servo-on of the control axes as the initial speeds in the move commands and accelerating the axes at the same acceleration rates causes the difference in position between the control axes to gradually increase and problems to arise such as increasing loads applied to the connecting parts (see FIG. 20).

SUMMARY OF THE INVENTION

In a first embodiment of the present invention, a numerical controller for synchronously operating a plurality of servomotors connected includes: actual speed detecting means for detecting an actual speed of a specified control axis at the point in time at which the servomotors are switched from a first state in which current is not supplied to the servomotors to a second state in which current is supplied to the servomotors; initial speed setting means for setting the actual speed detected by the actual speed detecting means as a common initial speed in move commands for control axes controllably driven by the servomotors; and acceleration and deceleration controlling means for controlling acceleration and deceleration of the control axes up to speeds specified in the move commands with the initial speed set by the initial speed setting means.

In a second embodiment of the present invention, a numerical controller for synchronously operating a plurality of servomotors connected includes: actual speed detecting means for detecting actual speeds of control axes controllably driven by the servomotors at the point in time at which the servomotors are switched from a first state in which current is not supplied to the servomotors to a second state in which current is supplied to the servomotors; initial speed setting means for setting a common initial speed in move commands for the control axes on the basis of the actual speeds detected by the actual speed detecting means and the speeds specified in the move commands after the servomotors are switched to the second state; and acceleration and deceleration controlling means for controlling acceleration and deceleration of the control axes up to the speeds specified in the move commands with the initial speed set by the initial speed setting means.

In a third embodiment of the present invention, a numerical controller for synchronously operating a plurality of servomotors connected includes: actual speed detecting means for detecting actual speeds of control axes controllably driven by the servomotors at the point in time at which the servomotors are switched from a first state in which current is not supplied to the servomotors to a second state in which current is supplied to the servomotors; initial speed setting means for setting, as a common initial speed in move commands for the control axes, an intermediate speed between the maximum and minimum actual speeds detected by the actual speed detecting means; and acceleration and deceleration controlling means for controlling acceleration and deceleration of the control axes up to speeds specified in the move commands with the initial speed set by the initial speed setting means.

The initial speed setting means may set an average value of the maximum and minimum speeds detected by the actual speed detecting means as a common initial speed in the move commands for the control axes.

The initial speed setting means may set an average value of the actual speeds of the respective axes, detected by the actual speed detecting means as a common initial speed in the move commands for the control axes.

In a fourth embodiment of the present invention, a numerical controller for synchronously operating a plurality of servomotors connected includes: actual speed detecting means for detecting actual speeds of control axes controllably driven by the servomotors at the point in time at which the servomotors are switched from a first state in which current is not supplied to the servomotors to a second state in which current is supplied to the servomotors; initial speed setting means for setting the actual speeds detected by the actual speed detecting means as initial speeds in move commands for the control axes; target axis selecting means for selecting a target axis from among the control axes according to a comparative relationship between the actual speed detected by the actual speed detecting means and the speed specified in the move commands after the servomotors are switched to the second state; and acceleration and deceleration controlling means for controlling acceleration and deceleration of the control axis not selected by the target axis selecting means to attain the position and speed of the target axis at an acceleration or deceleration rate specified in the move command; wherein differences in position and speed among the control axes are gradually decreased as the move commands are executed after the servomotors are switched from a first state in which current is not supplied to the servomotors to a second state in which current is supplied to the servomotors.

The target axis selecting means may select the target axis on the basis of a result of comparing the speeds specified in the move commands with the average value of the actual speeds of the control axes at the time in which the servomotors are switched from the first state to the second state.

In the present invention, an optimal initial speed is determined on the basis of the difference in speed and the comparative relationship between the actual speeds of the control axes and the control axis specified at the point in time at which the servomotors are switched to the servo-on state, and the initial speeds in the move commands for the control axes are commonly set to this optimal initial speed, so the difference in position between the control axes does not increase as the move commands are executed after servo-on and the load on the connecting part can be reduced.

The load on the connecting part can further be reduced because the actual speeds of the control axes are set as the initial speeds in the move commands issued at servo-on, a target axis is selected on the basis of the comparative relationship between the actual speeds, and the other control axis is accelerated or decelerated at the acceleration or deceleration rates specified in the move commands to attain the position and speed of the target axis, so that the difference in position before servo-on (in the servo-off state) and after servo-on can be eliminated when the other control axis attains the position and speed of the target axis.

The differences in position and speed between the control axes gradually decrease, so abrupt speed changes can be avoided and mechanical shocks can be suppressed.

BRIEF DESCRIPTION OF THE DRAWINGS

The above and other objects and features of the present invention will become apparent from the following description of preferred embodiments with reference to the accompanying drawings, in which:

FIG. 2 shows varying amounts of movement specified by move commands after servo-on;

FIG. 4 shows the speeds of a servomotor before and after servo-on;

FIG. 6 is a flowchart illustrating the processing performed by a processor in a numerical control section at predetermined distribution intervals after servo-on;

FIG. 9 is an example (Case A) of format of a move command issued after servo-on;

FIG. 10 is a first example (Case B) of determining the initial speed in move commands at servo-on;

FIG. 11 is a second example (Case C) of determining the initial speed in move commands at servo-on;

FIG. 12 is a third example (Case D) of determining the initial speed in move commands at servo-on;

FIG. 13 is a fourth example (Case E) of determining the initial speed in move commands at servo-on;

FIG. 14 is a first example (Case F) of acceleration/deceleration after servo-on;

FIG. 15 is a second example (Case G) of acceleration/deceleration after servo-on;

FIG. 16 is a third example (Case H) of acceleration/deceleration after servo-on;

FIG. 17 is a fourth example (Case I) of acceleration/deceleration after servo-on;

FIG. 18 is a fifth example (Case J) of acceleration/deceleration after servo-on;

DETAILED DESCRIPTION OF THE PREFERRED EMBODIMENTS

First, the outline of the numerical controller described in the above Japanese Patent Application Serial No. JP2005-370821 will be described. This numerical controller starts to control the position and speed of the control axis smoothly without abrupt change in speed when the servomotor is switched from a first state in which current is not supplied to the servomotor and the control axis controllably driven by the control axis is coasting to a second state in which current is supplied to the servomotor to control the position and speed of the control axis.

Figure 1:
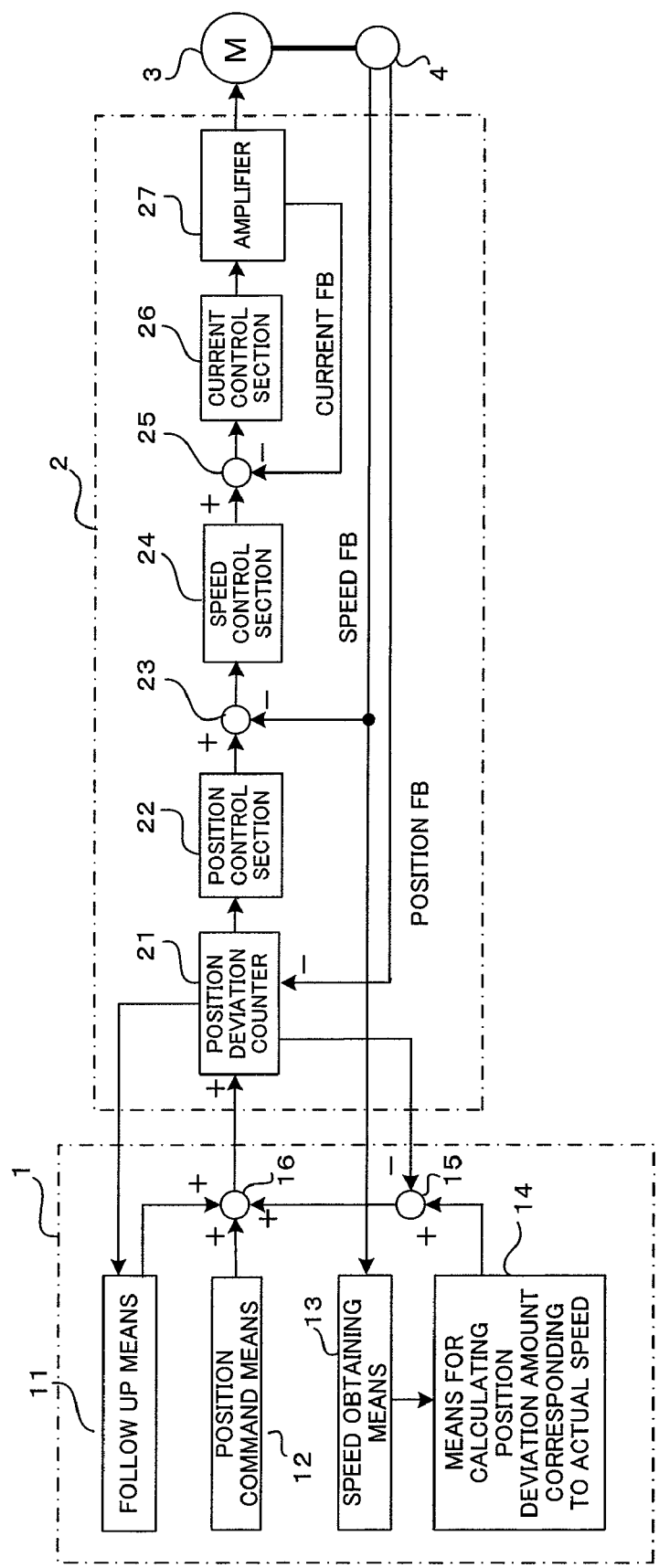
FIG. 1 is a block diagram showing the main elements of a numerical controller equipped with speed obtaining means.

Referring to FIG. 1, the numerical controller, similar to conventional numerical controllers, includes a numerical control section 1 and a motor control section 2. The motor control section 2 performs position and speed loop control of a servomotor 3 according to move commands issued from the numerical control section 1 and further performs current loop control of the servomotor 3 to control the position and speed of the servomotor 3 (and the control axis driven by the servomotor 3). Unlike conventional numerical controllers, the numerical controller in FIG. 1 has a speed obtaining means 13, calculating means 14 for calculating position deviation amount corresponding to an actual speed, and adder-subtractors 15,16 in the numerical control section 1, and further, the position command means 12 for issuing move commands distributes the move commands with an initial speed which is determined from the current actual speed at servo-on.

To control the position of the servomotor 3 and thus the control axis driven by the servomotor, the position command means 12 distributes move commands as instructed by an NC program or an operator as in the prior art, calculates a command movement amount MCMD to be distributed for each predetermined distribution cycle (at intervals at which move commands are issued), and outputs the MCMD through the adder-subtractor 16 to a position deviation counter 21 in the motor control section 2. With no command from the adder-subtractor 15 nor from a follow-up means 11 in this case, the command movement amount MCMD to be distributed calculated by the position command means 12 is added at it is to the position deviation counter 21.

The position deviation counter 21 calculates a position deviation by adding the command movement amount MCMD to be distributed and subtracting the position feedback amount fed back from the position/speed detector 4. The position control section 22 calculates a speed command by multiplying the position deviation by a position loop gain.

The adder-subtractor 23 calculates a speed deviation by subtracting from the speed command the speed feedback amount fed back from the position/speed detector 4. The speed control section 24 calculates a torque command (current command) by performing speed loop control such as PI control (proportional-plus-integral control). To control the activation of the servomotor 3 through the amplifier 27, the adder-subtractor 25 calculates a current deviation by subtracting the current feedback amount fed back from the current detector provided in the amplifier 27 from the torque command received from the speed control section 24 and performs current loop control through the current control section 26.

The position control operation described above is no different from the position control operation performed in conventional numerical controllers.

When the servomotor 3 is switched to a servo-off state by disconnecting the servomotor 3 from power supply, the servomotor 3 becomes freely rotatable. When the control axis (movable mold or the like in a die casting machines or pressing machines) driven by the servomotor 3 is ejected by an external force such as a hydraulic pressure, the movable part and the servomotors start to coast. To locate the position of the servomotor 3 (and the position of the control axis) that is coasting, the numerical control section 1 has a follow-up means 11 which starts to operate upon servo-off.

As the servomotor 3 coasts, position feedback signals from the position/speed detector 4 are input to the position deviation counter 21. For example, as the servomotor 3 coasts in the positive direction, negative values are input to the position deviation counter 21. The follow-up means 11 in the numerical control section 1 reads the value in the position deviation counter 21 at predetermined intervals, updates the value in the current position register that stores the current position of the servomotor (movable part) 3 with the value read out of the position deviation counter 21, and outputs the sign-inverted value of the read-out value to the position deviation counter 21 through the adder-subtractor 16 to clear the position deviation counter 21 to '0'.

In the servo-off state, there is no input to the position deviation counter 21 from the position command means 12 through the adder-subtractor 16, nor from the adder-subtractor 15 through the adder-subtractor 16.

In the servo-off state, the follow-up means 11 repeatedly operates to update the current position of the servomotor, clearing the position deviation counter to '0'. When the servomotor 3 is connected to the power supply and switched to a servo-on state, position control is initiated.

In die casting machines, pressing machines, and other machines in which movable molds (control axes) are driven by servomotors, position control is initiated upon servo-on when the movable molds (control axes) are ejected from the stationary molds by an external force such as a hydraulic pressure.

Upon servo-on, the speed obtaining means 13 in the numerical control section 1 obtains the actual speed detected by and fed back from the position/speed detector 4 and outputs this actual speed to the position command means 12. The position command means 12 calculates a command movement amount to be distributed, by using the actual speed as the initial speed, and outputs the calculated amount. The calculating means 14 for calculating a position deviation amount corresponding to the actual speed calculates, only in the first distribution cycle after servo-on, an amount of position deviation corresponding to the actual speed obtained by the speed obtaining means 13. The adder-subtractor 15 adds the calculated amount of position deviation to the sign-inverted value of the amount of position deviation remaining in the position deviation counter. The adder-subtractor 16 adds this added value to the command movement amount output from the position command means 12 and outputs the resultant value to the position deviation counter 21.

The calculating means 14 for calculating a position deviation amount corresponding to the actual speed calculates the amount of position deviation as follows:

Amount of position deviation=Speed/position loop gain

Assuming that the actual speed detected by the position/speed detector 4 at servo-on is V0, and the amount of position deviation corresponding to the actual speed at servo-on is ERRv0, $ERRv0=V0$/position loop gain.

Thus, the amount of position deviation ERRv0 is determined from the actual speed V0 at servo-on and the position loop gain.

Assuming that the command movement amount to be distributed in the first distribution cycle after servo-on, calculated by the position command means 12 using the actual speed as the initial speed, is MCMDv0, and the amount of position deviation remaining in the position deviation counter 21 at servo-on is ERRsvon, the command value to be output to the position deviation counter 21 in the first distribution cycle after servo-on is:

MCMDv0+ERRv0−ERRsvon.

In subsequent distribution cycles, the movement command amounts to be distributed, calculated by the position command means 12 using the actual speeds as the initial speeds and according to the move command instructed by the program or operator, are output to the position deviation counter 21.

Figure 2:
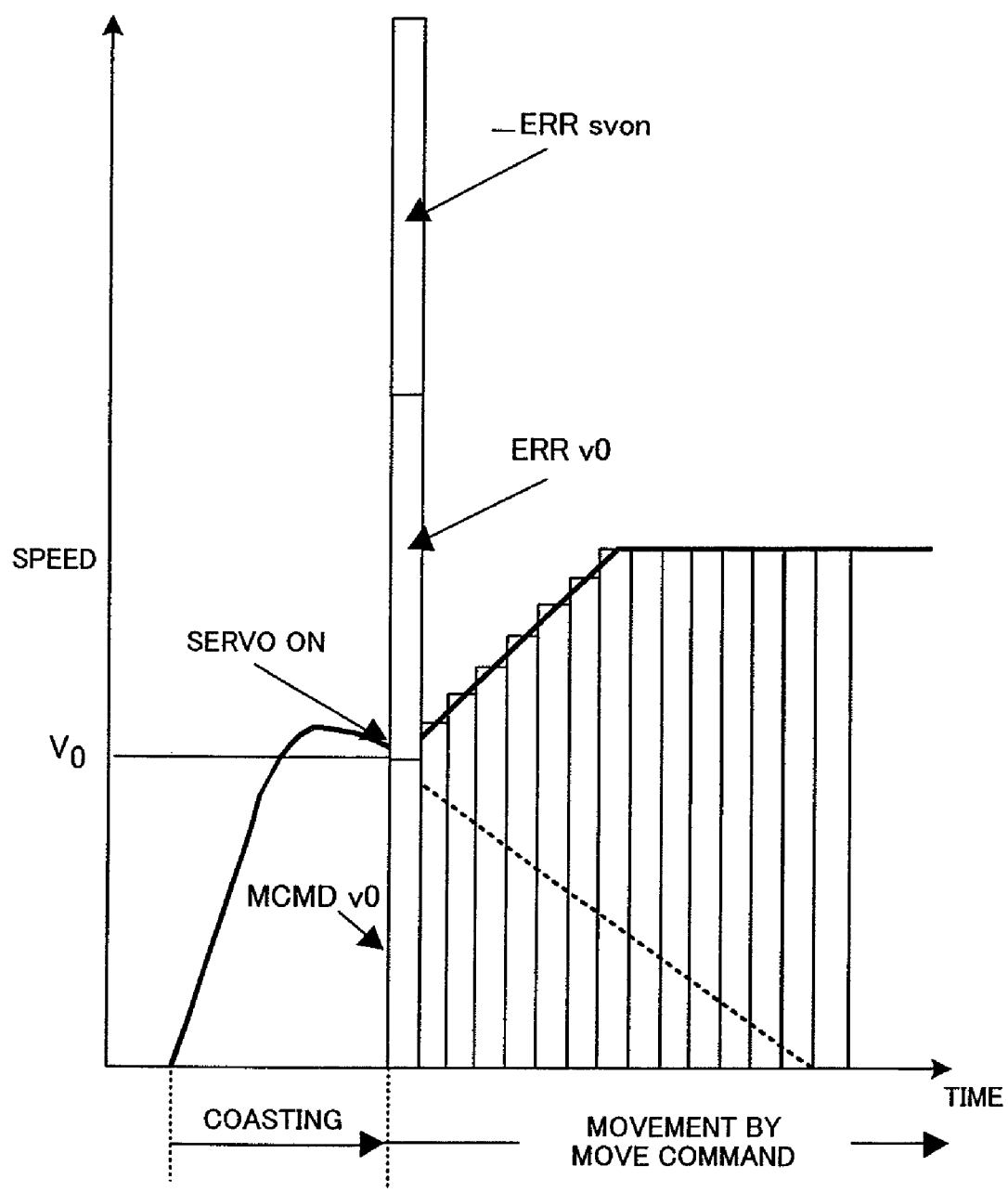

FIG. 2 shows varying amounts of movement instructed in move commands after servo-on;

When the servomotor 3 coasting in the servo-off state is switched to the servo-on state, the command value "MCMDv0+ERRv0−ERRsvon" is output to the position deviation counter 21 in the first distribution cycle after servo-on as described above. In subsequent cycles, the position command means 12 issues acceleration/deceleration-processed command movements, with the actual speeds obtained by the speed obtaining means 13 set as an initial speed, as instructed by the program or an operator.

In the first distribution cycle after servo-on, the command movement amount "MCMDv0+ERRv0−ERRsvon" is output to the position deviation counter 21, as described above. In this case, addition to the position deviation counter 21 "−ERRsvon", the sign-inverted value of the amount of position deviation ERRsvon remaining in the position deviation counter 21 at servo-on, leads to clearance of the movement amount remaining in the position deviation counter 21. Further, although "ERRv0", which indicates the movement amount of the servomotor 3 until the current move command is issued (or movement amount of the servomotor 3 in one distribution cycle), is added to the position deviation counter 21, this value is subtracted by the position feedback amount. As a result, the amount remaining in the position deviation counter 21 is only the command movement amount "MCMDv0" obtained and output by the position command means 12. Accordingly, the servomotor 3 is driven with the command movement amount "MCMDv0" to be distributed, which is equal to the amount of position deviation, and starts to move smoothly at its coasting speed at servo-on as shown in FIG. 2, so no abrupt deceleration occurs.

Figure 3:
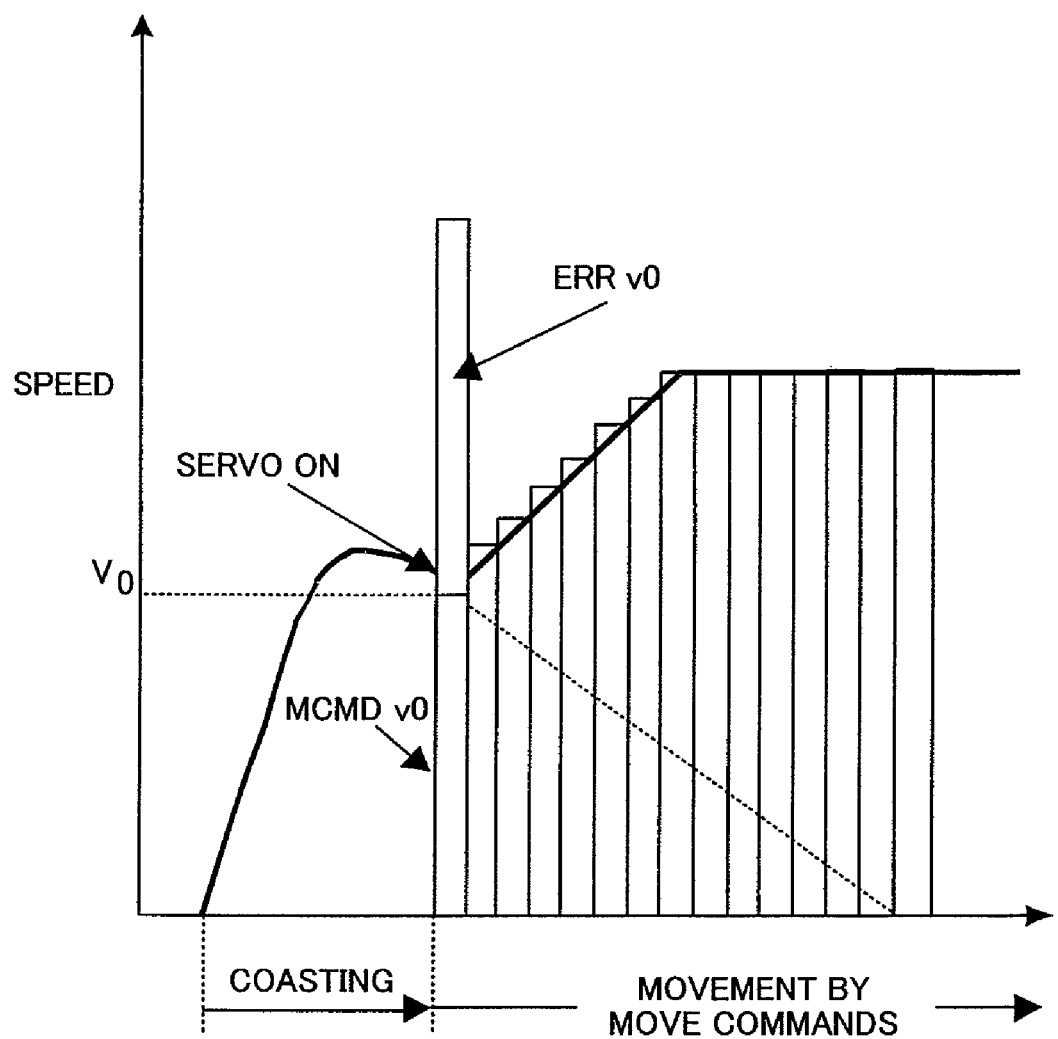
FIG. 3 shows varying amounts of movement (speeds of a servomotor) specified by move commands after servo-on, when the amount of position deviation is negligible.

In the above example, the sign-inverted value of the amount of position deviation ERRsvon remaining in the position deviation counter 21 at servo-on is added to the position deviation counter 21 in the first distribution cycle after servo-on. Instead, if the servo-on is switched in the timing when the follow-up means 11 clears the position deviation counter 21 to zero, then the amount of position deviation ERRsvon becomes zero, as a result, the adder-subtractor 15 is not required and the position deviation counter 21 needs not be biased with this amount of position deviation ERRsvon in the first distribution cycle after servo-on. Similarly, if the amount of position deviation ERRsvon remaining in the position deviation counter 21 at servo-on is negligible, the sign-inverted value of the amount of position deviation ERRsvon needs not be added to the position deviation counter 21 and the adder-subtractor 15 becomes unnecessary. FIG. 3 shows the command movement amount (speed of the servomotor) at servo-on in this case.

Figure 4:
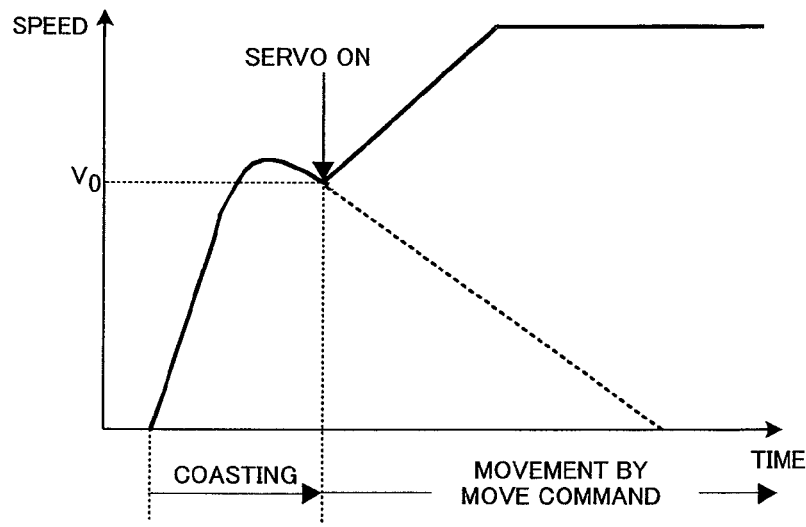

The servomotor driven in this way is controlled to start to move at its coasting speed at servo-on, and then accelerated to a target speed specified by the program or operator as shown in FIG. 4.

Figure 5:
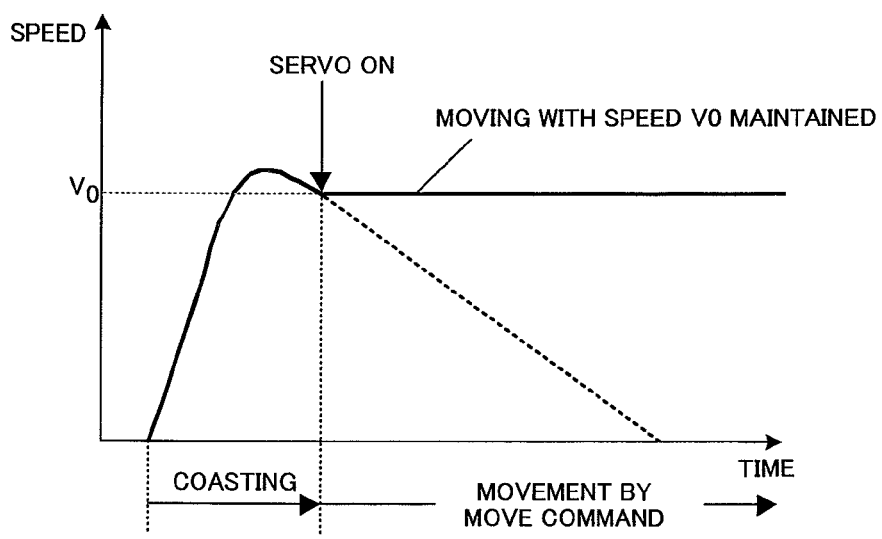
FIG. 5 shows the speeds of the servomotor when the actual speed obtained at servo-on is set as the initial speed and the target speed.

It is also possible to maintain a speed after servo-on constant by setting the actual speed obtained at servo-on as the initial speed and target speed as shown in FIG. 5.

Figure 6:
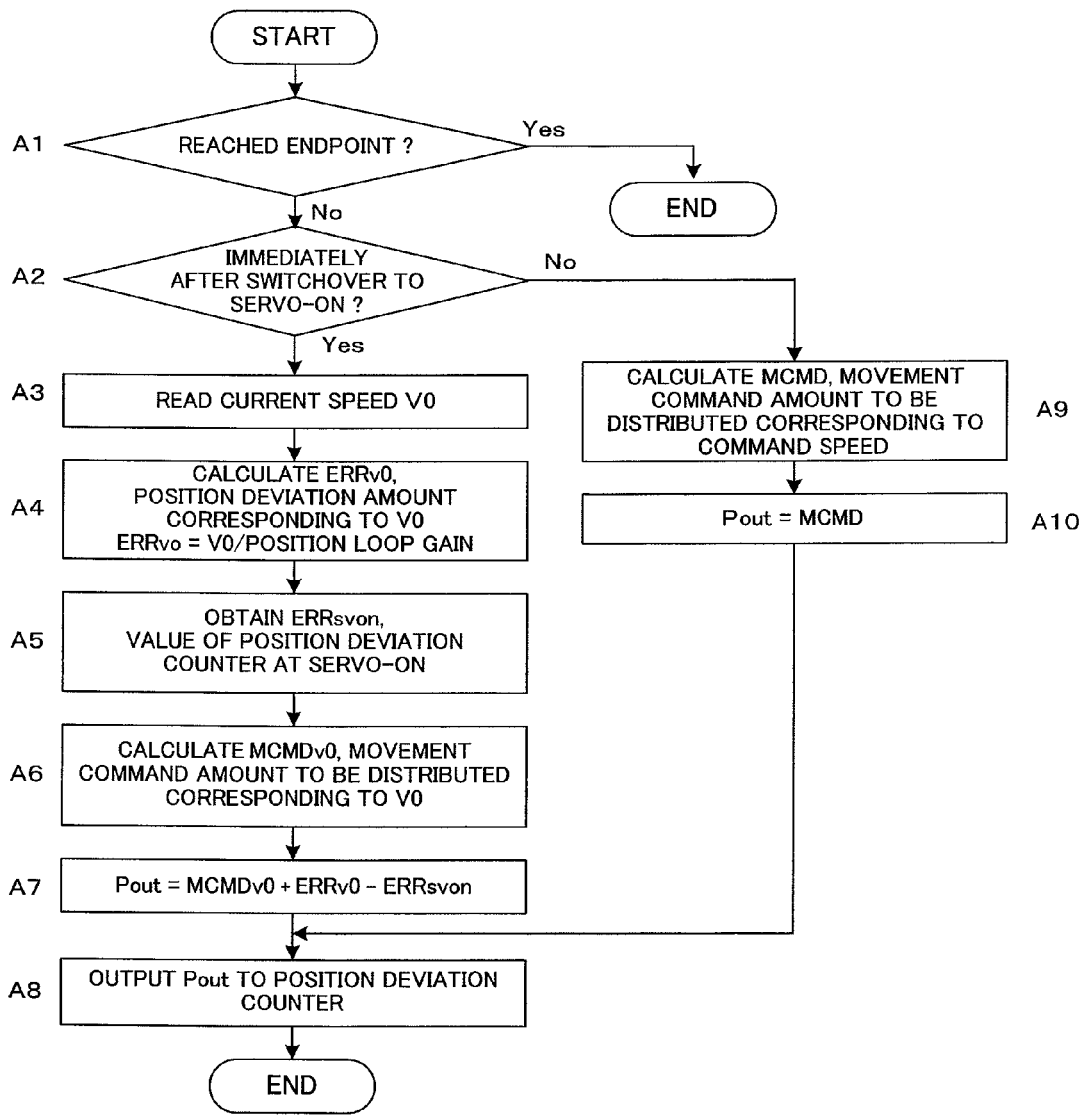

FIG. 6 is a flowchart illustrating the processing performed by a processor in the numerical control section 1 at predetermined distribution intervals after servo-on.

It is checked whether the control axis (servomotor 3) has reached the endpoint instructed by the NC program or operator (step A1). If not, it is then checked whether it is in the first cycle after servo-on (step A2). If in the first cycle, the actual speed V0 that is the current speed output from the position/speed detector 4 is read (step A3), and the amount of position deviation ERRv0 corresponding to the actual speed V0 is calculated by the following equation (step A4):

$ERRv0 = V0/\text{position loop gain}.$

Next, the amount of position deviation ERRsvon to be stored in the position deviation counter 21 at this point in time (at servo-on) is read (step A5). The actual speed V0 read in step A3 is used as the initial speed, and the command movement amount MCMDv0 to be distributed is calculated according to the actual speed V0 (step A6). Then, an command movement amount Pout is calculated by adding the command movement amount MCMDv0 to be distributed calculated in step A6, the amount of position deviation ERRv0 corresponding to the actual speed V0 calculated in step A4, and the sign-inverted value of the amount of position deviation ERRsvon calculated in step A5 (step A7).

$Pout = MCMDv0 + ERRv0 - ERRsvon.$

The command movement amount Pout thus calculated is output to the position deviation counter 21 (step A8), to complete the move command distribution processing for the current cycle.

In the next cycle, which is not the cycle immediately after the servo-on, control proceeds from step A2 to step A9 where the command movement amount MCMD to be distributed is set as the command movement amount using the actual speed V0 at servo-on as the initial speed and according to the speed instructed by the NC program or operator (step A10). Then, control proceeds to step A8 where the command movement amount Pout is output to the position deviation counter 21, to complete the move command distribution processing for the current cycle.

Figure 7:
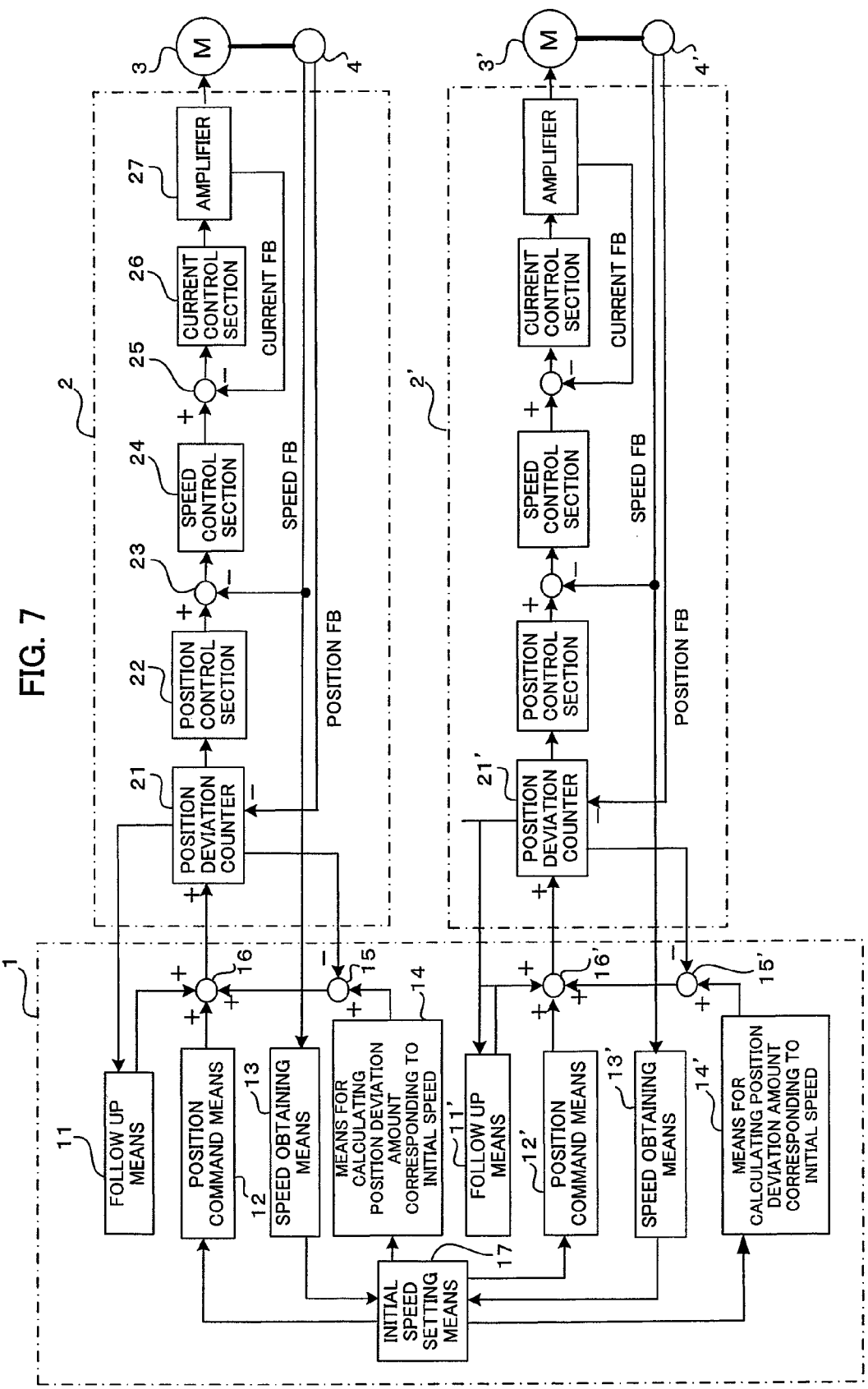
FIG. 7 is a block diagram showing the main elements of a numerical controller according to an embodiment of the present invention.

FIG. 7 is a block diagram showing the main elements of the numerical controller that executes the following processing. An initial speed setting means 17 determines an the initial speed in move commands for control axes at servo-on on the basis of parameter setting and the comparative relationship and difference in speed between the actual speeds of the control axes. The parameter specifies a reference axis the actual speed of which is used as the initial speed. The initial speed setting means 17 receives the actual speeds obtained by speed obtaining means 13,13'. The initial speed setting means 17 determines the initial speed from the input actual speeds, the parameter setting, and the comparative relationship and difference in speed between the actual speeds. The determined initial speed is output to position command means 12,12' and calculating means 14,14' for calculating position deviation amounts corresponding to the initial speed. The position command means 12,12' calculate the movement command amount to be distributed using the determined initial speed as the initial speed and output the calculated amounts. The movement command amount to be distributed can be calculated by the method illustrated in the flowchart in FIG. 6.

Figure 8:
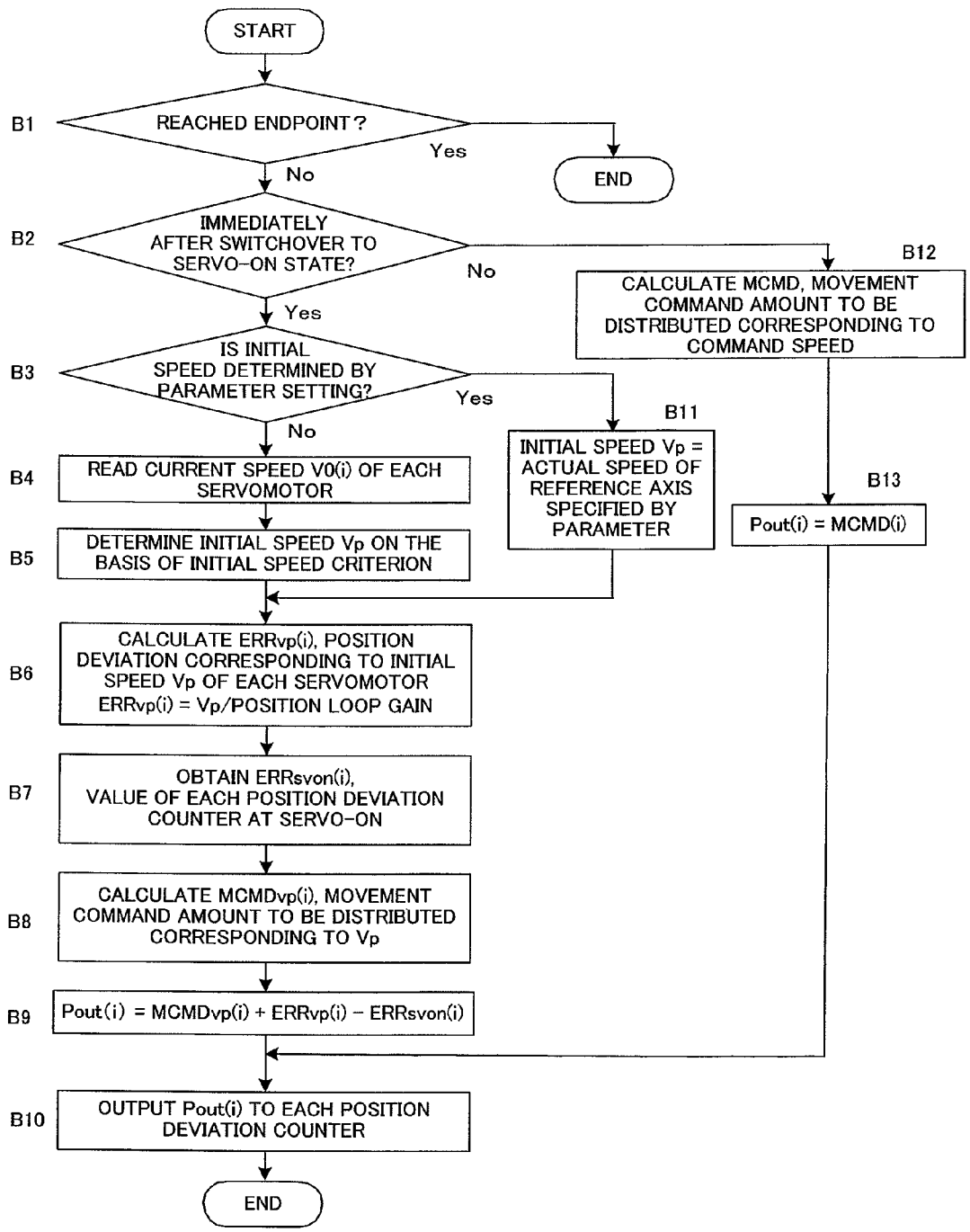
FIG. 8 is a flowchart illustrating the processing performed by a processor in a numerical control section at predetermined distribution intervals after servo-on when a plurality of servomotors are connected and synchronously operated.

FIG. 8 is a flowchart illustrating the processing performed by a processor in a numerical control section 1 at predetermined distribution intervals after switched to servo-on from servo-off when a plurality of servomotors are connected and synchronously operated.

It is checked whether the control axes have reached the endpoint instructed by the NC program or operator (step B1); if not, it is then checked whether this cycle is the first cycle after servo-on (step B2). If it is the first cycle, it is then checked whether the initial speed is determined by the parameter setting (step B3); if so, the actual speed of the reference axis set by the parameter is read and set as the initial speed Vp (step B11). On the other hand, if the initial speed is not determined by the parameter setting, the current speed V0(i) of each servomotor is read (step B4). Then, an initial speed Vp is determined from the current speed V0(i) on the basis of the initial speed criterion (step B5), and the amount of position deviation ERRvp(i) corresponding to the initial speed Vp is calculated (step B6). Here, 'i' denotes the axis number; when there are two control axes, 'i'=1 or 2; when there are three control axes, 'i'=1, 2, or 3.

Next, the amount of position deviation ERRsvon(i) to be stored in each position deviation counter at this point in time (at servo-on) is read (step B7). A command movement amount MCMDvp(i) to be distributed is calculated according to the initial speed obtained in step B5 or B11 (step B8). Then, a command movement amount Pout(i) is calculated by adding the command movement amount MCMDvp(i) to be distributed calculated in step B8, the amount of position deviation ERRvp(i) corresponding to the initial speed Vp calculated in step B6, and the sign-inverted value of the amount of position deviation ERRsvon(i) calculated in step B7 (step B9). The calculated Pout(i) is output to each position deviation counter (step B10), to complete the move command distribution processing for the current cycle.

Several examples of determining the initial speed Vp will be described below.

The following "Case A" through "Case E" are examples in which a common speed is set as the initial speeds in move commands for control axes at servo-on, so that the difference in position among the control axes does not increase.

Case A (see FIG. 9): the actual speed of the reference axis is used as the initial speed.

Figures 9, 10:
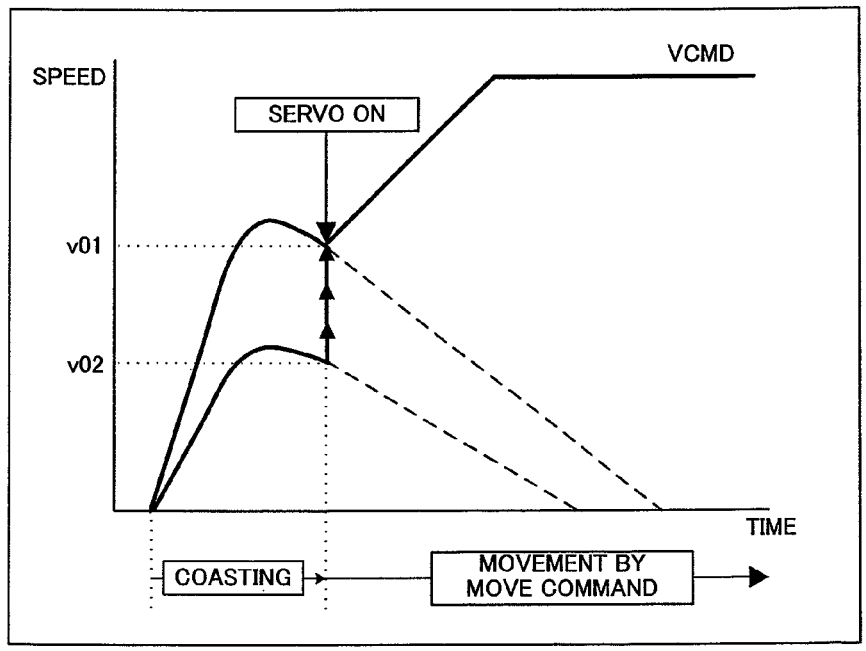

The move commands after servo-on are issued in the format as shown in FIG. 9. In this format, 'X' denotes the starting address of a move command signal. This command sets the operation type to absolute or incremental and the axis control data to coordinate values or movement amount. The initial speed specified in the move command for each control axis at servo-on is the actual speed of the reference axis specified by the parameter or 'X+06'. In the first example of setting the initial speed, the initial speed set by the initial speed setting means 17 in the move command for each control axis at servo-on is the actual speed of the reference axis specified by the parameter or the 'X+06' in the above command.

The following Cases B through D are examples of determining the initial speed in the move command at servo-on when the servomotors drive two control axes, in which the initial speed is set on the basis of the command speed and the comparative relationship between the actual speeds of the first and second control axes at servo-on. The move commands after servo-on are issued in the format as described with reference to Case A and FIG. 9. It is assumed that the speed instructed in the move commands after servo-on is VCMD, and the actual speeds of the first and second control axes at servo-on are v01 and v02, respectively.

Case B (see FIG. 10): VCMD>v01 and VCMD>v02
If v01>v02, the initial speed in the move command is v01,
if v01=v02, the initial speed in the move command is v01 or v02, and
if v01<v02, the initial speed in the move command is v02.

Figure 11:
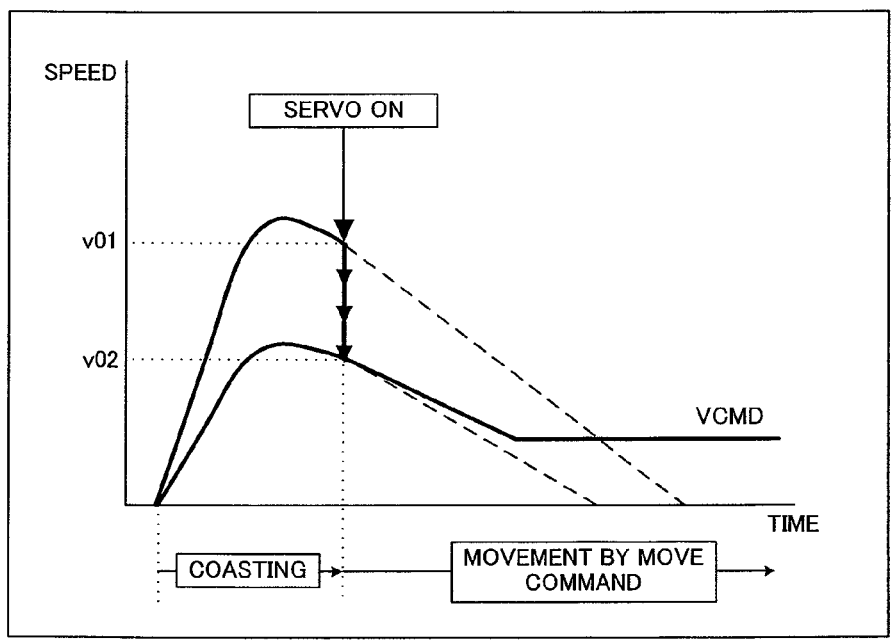

Case C (see FIG. 11): VCMD<v01 and VCMD<v02
If v01>v02, the initial speed in the move command is v02,
if v01=v02, the initial speed in the move command is v01 or v02, and
if v01<v02, the initial speed in the move command is v01.

Figure 12:
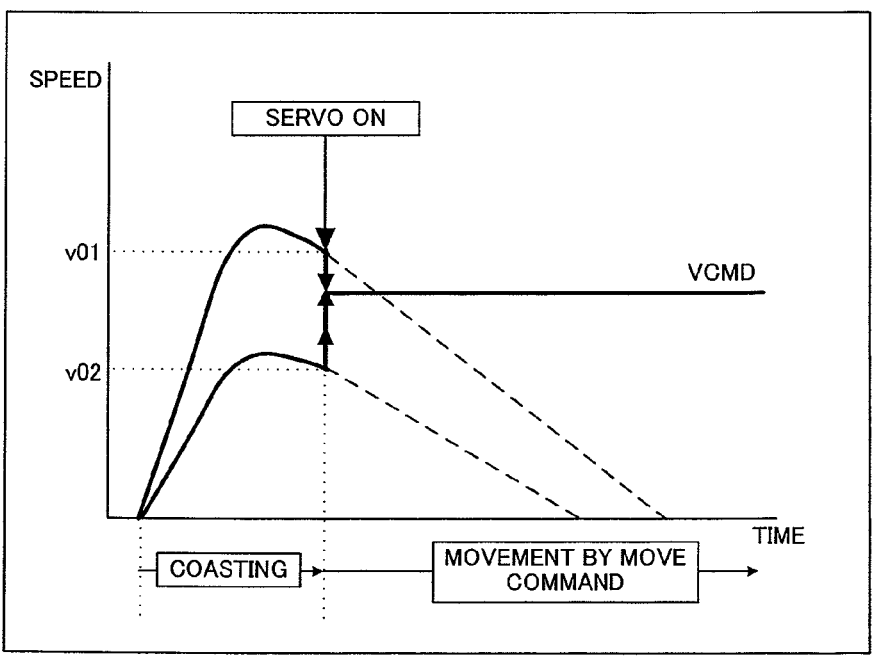

Case D (see FIG. 12): When VCMD≧v01 and VCMD≦v02, or VCMD≦v01 and VCMD≧v02, the initial speed in the move command is VCMD.

In the above Cases B through D, for simplification of the description, the number of control axes driven by the servomotors is two, but the initial speed in the move commands can be similarly calculated in the case where the number of control axes driven by the servomotors is three or more.

Figure 13:
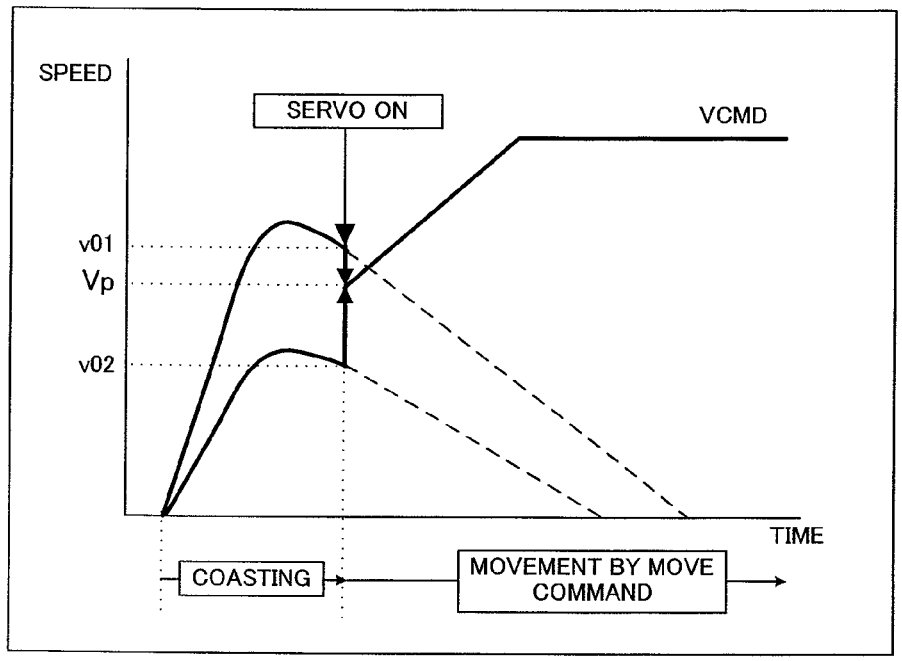

Case E (see FIG. 13): the number of control axes to be controlled by the servomotors is two (first and second axes), and the initial speed in the move commands at servo-on is set on the basis of the actual speeds of the first and second control axes at servo-on and an intermediate speed between them. The move commands after servo-on are issued in the format as described with reference to Case A and FIG. 9.

It is assumed that the actual speeds of the first and second control axes at servo-on are v01 and v02, respectively, and the intermediate speed between them is vP. The initial speed in the move commands for the first and second axes is set to vP and the move commands are issued.

In the above Case E, for simplification of the description, the number of control axes driven by the servomotors is two, but the initial speed in the move commands is similarly set to vP in the case where the number of control axes driven by the servomotors is three or more.

Another embodiment will now be described in which the number of control axed to be controlled by the servomotors is three (first, second and third control axes), and the initial speed in the move commands at servo-on is set on the basis of the actual speeds of the first, second and third control axes at servo-on and an intermediate speed between them. The move commands after servo-on are issued in the format as described with reference to FIG. 9. It is assumed here that the actual speeds at servo-on of the first, second and third control axes are v01, v02 and v03, respectively, and a common initial speed in the move commands for the control axes is vP.

When v01>v02>v03, the move commands are issued with the initial speed which is set to an average speed "vP=(v01+v03)/2" between the maximum speed (v01) and the minimum speed (v03) or to an average speed "vP=(v01+v02+v03)/3" of the actual speeds of the three control axes. In the above cases, for simplification of the description, the number of control axes driven by the servomotors is three, but the initial speed in the move commands can be similarly calculated in the case where the number of control axes driven by the servomotors is four or more.

The following Cases F through J are examples of selecting the actual speeds of the control axes as the initial speeds in the move commands, instead of setting an initial speeds common to the control axes.

The following Cases F through J are examples in which the number of control axes driven by the servomotors is two and acceleration/deceleration is performed at servo-on. The move commands after servo-on are issued in the format as described with reference to FIG. 9. It is assumed that the speed instructed in the move commands after servo-on is VCMD, and the actual speeds of the two (first and second) control axes at servo-on are v01 and v02, respectively.

Figure 14:
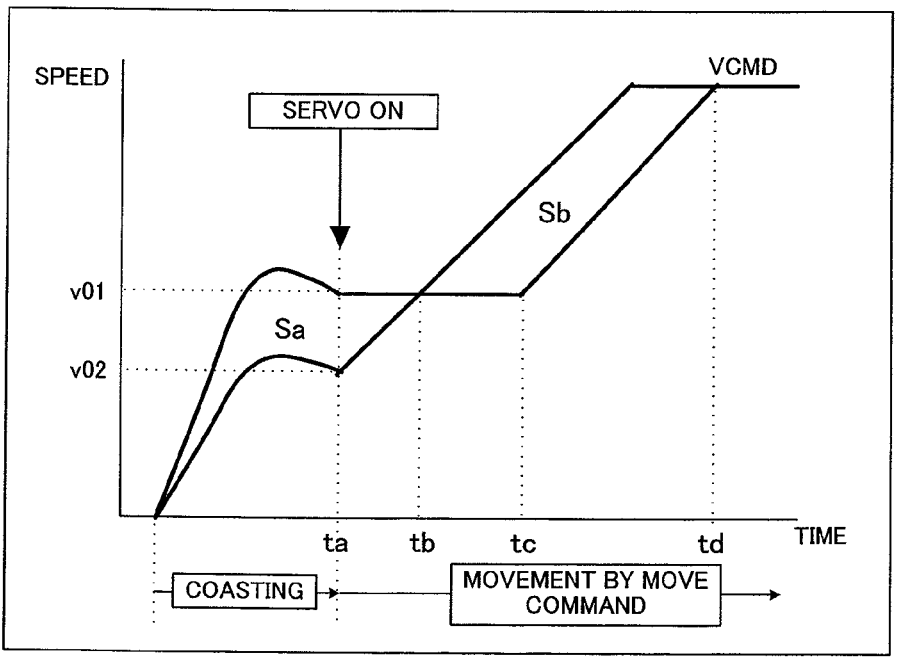

Case-F (see FIG. 14): VCMD>v01 and VCMD>v02:
Here, the first axis, which is faster, is the slave axis and the second axis, which is slower, is the target axis. After servo-on, the target axis (second axis) is controlled as instructed by the move command, while the slave axis (first axis) is subjected to follow-up control in the following manner to attain the speed and position of the target axis.

(1) The slave axis (first axis) continues moving at the speed v01 at servo-on.

(2) The comparative relationship between the slave axis speed and the target axis (second axis) speed is reversed at time tb, and the difference in position between the target axis and the slave axis starts to decrease. The time tc at which acceleration starts is calculated by the following equation so that the difference in position Sa becomes Sb.

Assuming that the positions of the slave axis (first axis) and target axis (second axis) at time tb are P1$tb$ and P2$tb$, respectively, as Sa=Sb, $$P1tb-P2tb=(tc-tb)\times(VCMD-v01)$$

Accordingly, $$tc=(P1tb-P2tb)/(VCMD-v01)+tb$$

(3) The slave axis starts to be accelerated at time tc and attains the target speed VCMD at time td at which the position difference becomes zero.

Figure 15:
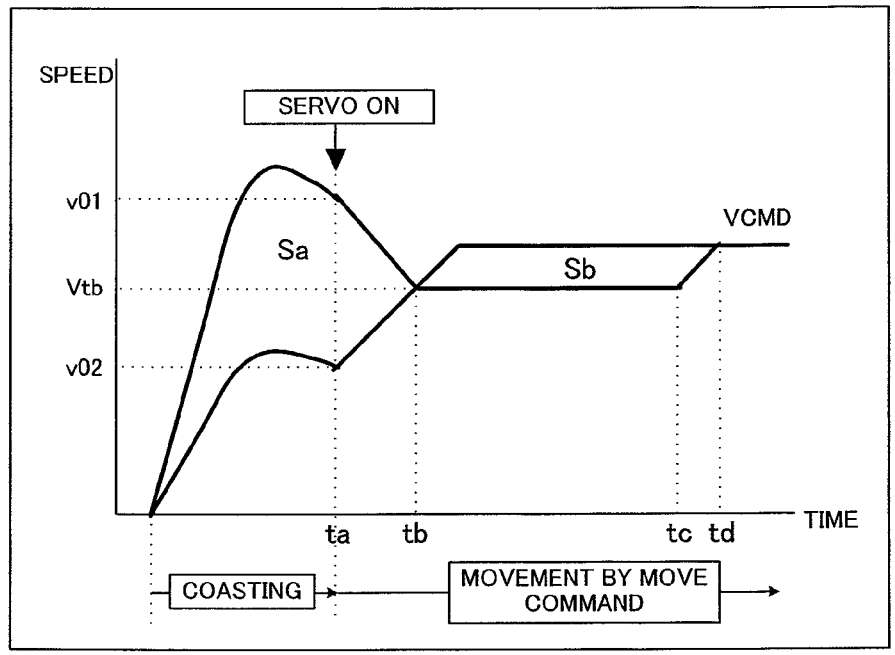

Case G (see FIG. 15): $v01 \leq VCMD \geq (v01+v02)/2$:

Here, the first axis, which is faster, is the slave axis and the second axis, which is slower, is the target axis. After servo-on, the target axis (second axis) is controlled as instructed by the move commands, while the slave axis (first axis) is subjected to follow-up control in the following manner to attain the speed and position of the target axis.

(1) The slave axis (first axis) is decelerated at the deceleration rate specified in the command.

(2) The speed of the slave axis matches the speed of the target axis (second axis) at time tb. Assuming that this speed at this point in time is Vtb, the slave axis subsequently continues to move at speed Vtb. At time tb, the comparative relationship between the slave axis speed and the target axis (second axis) speed is reversed and the difference in position between the target axis and slave axis starts to decrease. The time tc at which acceleration starts is calculated by the following equation so that the difference in position Sa becomes Sb.

Assuming that the positions of the slave axis (first axis) and target axis (second axis) at time tb are P1*tb* and P2*tb*, respectively, as Sa=Sb, $$P1tb-P2tb=(tc-tb) \times (VCMD-Vtb)$$

Accordingly, $$tc=(P1tb-P2tb)/(VCMD-Vtb)+tb$$

(3) The slave axis starts to be accelerated at time tc and attains the target speed VCMD at time td at which the position difference becomes zero.

Figure 16:
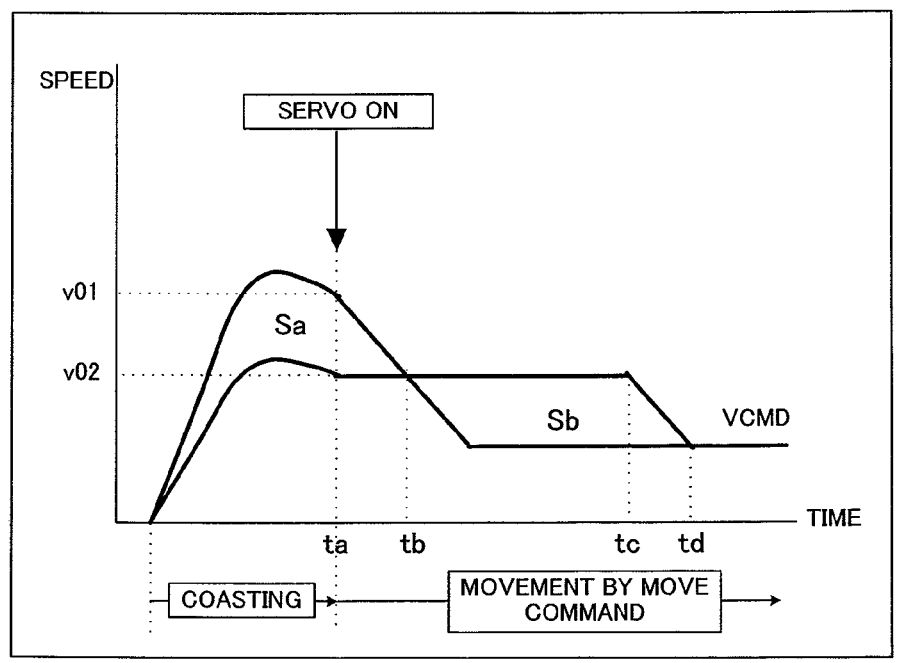

Case H (see FIG. 16): VCMD<v01 and VCMD<v02:

Here, the first axis, which is faster, is the target axis and the second axis, which is slower, is the slave axis. After servo-on, the target axis (first axis) is controlled as instructed by the move commands, while the slave axis (second axis) is subjected to follow-up control in the following manner to attain the speed and position of the target axis.

(1) The slave axis (second axis) continues moving at the speed v02 at servo-on.

(2) The speed of the slave axis (second axis) matches the speed of the target axis (first axis) at time tb and then the comparative relationship between the speeds of both axes is reversed and the difference in position between the target axis and the slave axis starts to decrease. The time tc at which deceleration starts is determined by the following equation so that the position difference Sa becomes Sb.

Assuming that the positions of the target axis (first axis) and slave axis (second axis) at time tb are P1*tb* and P2*tb*, respectively, as Sa=Sb, $$P1tb-P2tb=(tc-tb) \times (v02-VCMD)$$

Accordingly, $$tc=(P1tb-P2tb)/(v02-VCMD)+tb$$

(3) The slave axis starts to be decelerated at time tc and attains the target speed VCMD at time td at which the position difference becomes zero.

Figure 17:
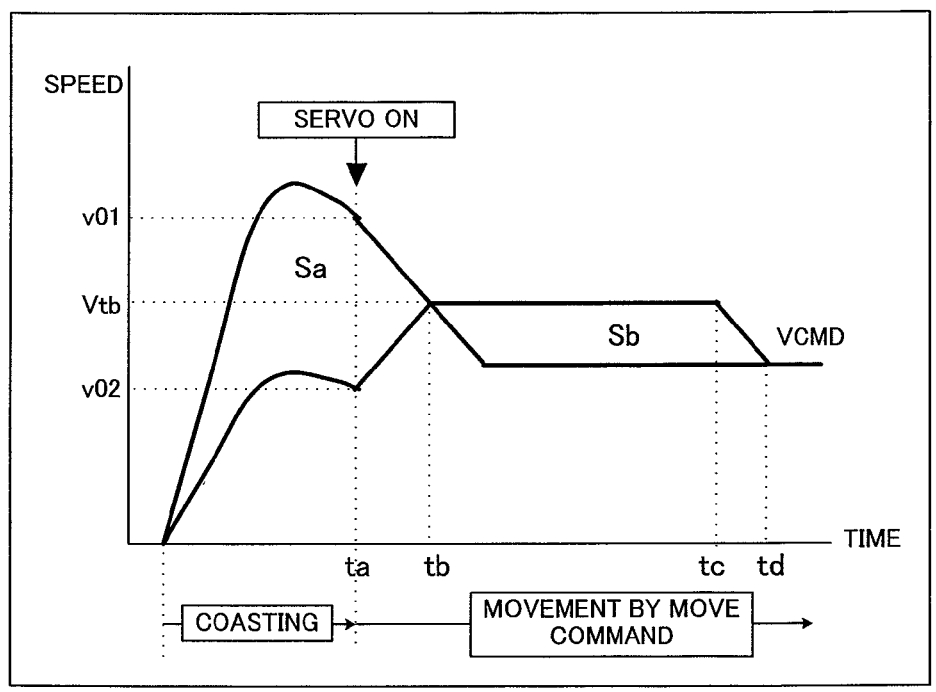

Case I (see FIG. 17): $v02 \leq VCMD < (v01+v02)/2$:

Here, the first axis, which is faster, is the target axis and the second axis, which is slower, is the slave axis. After servo-on, the target axis (first axis) is controlled as instructed by the move commands, while the slave axis (second axis) is subjected to follow-up control in the following manner to attain the speed and position of the target axis.

(1) The slave axis (second axis) is accelerated at the acceleration rate specified in the command.

(2) The speed of the slave axis matches the speed of the target axis at time tb. Assuming that this speed at this point in time is Vtb, the slave axis subsequently continues to move at speed Vtb. At time tb, the comparative relationship between the slave axis speed and the target axis (first axis) speed is reversed and the position difference between the target axis and slave axis starts to decrease. The time tc at which deceleration starts is calculated by the following equation so that the position difference Sa becomes Sb.

Assuming that the positions of the target axis (first axis) and slave axis (second axis) at time tb are P1*tb* and P2*tb*, respectively, as Sa=Sb, $$P1tb-P2tb=(tc-tb) \times (Vtb-VCMD)$$

Accordingly, $$tc=(P1tb-P2tb)/(Vtb-VCMD)+tb$$

(3) The slave axis starts to be decelerated at time tc and attains the target speed VCMD at time td at which the position difference becomes zero.

In the above case, for simplification of the description, the number of control axes driven by the servomotors is two, but a similar acceleration/deceleration control can be performed by setting one axis to the target axis and the other axes to slave axes in the case where the number of control axes driven by the servomotors is three or more axes.

Figure 18:
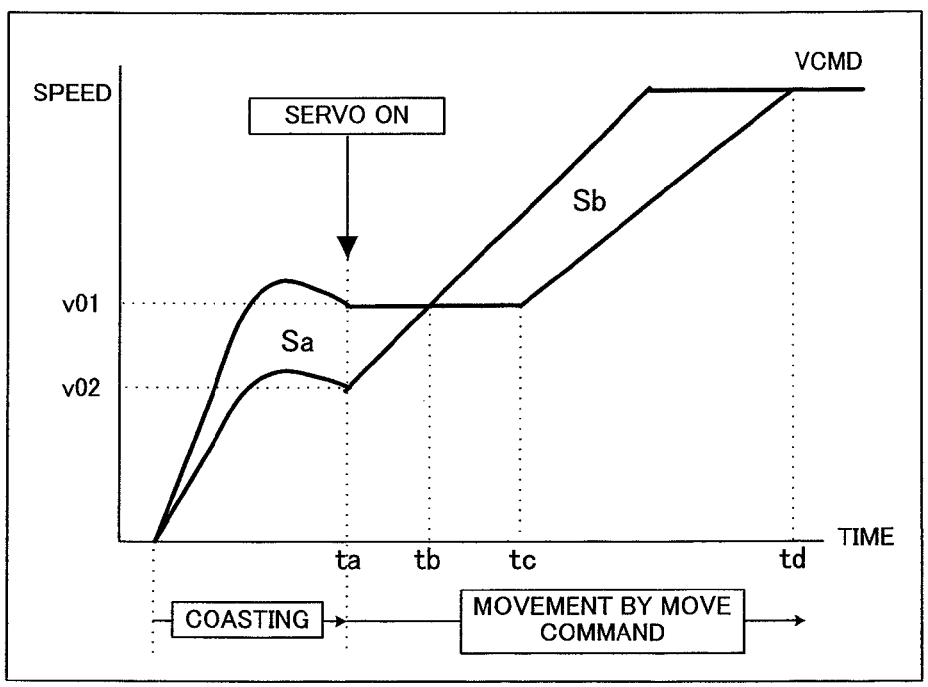

Case J (FIG. 18):

In the above Cases F through I, the slave axis is accelerated or decelerated after time tc at the acceleration or deceleration rate common to the target axis. Instead, the slave axis may be accelerated or decelerated after time tc at an acceleration or deceleration rate different from that of the target axis as shown in FIG. 18 as long as the position difference Sa becomes equal to Sb (Case J). Assuming that the point in time at which the target axis attains the instructed speed VCMD is te and the acceleration rates of the target axis and slave axis are A1 and A2, respectively, $$te = tb + (VCMD - v01)/A1, \text{ and}$$

$$td = tc + (VCMD - v01)/A2,$$

as $Sa = Sb$, $$P1tb - P2tb = ((tc - tb) + (td - te)) \times (VCMD - v01)/2$$
$$= \{(tc - tb) + [tc + (VCMD - v01)/A2] -$$
$$[tb + (VCMD - v01)/A1]\} \times (VCMD - v01)/2.$$

Accordingly, $$tc = \frac{(P1tb - P2tb)}{(VCMD - v01)} + tb + \frac{(VCMD - v01)}{2A1} - \frac{(VCMD - v01)}{2A2}.$$

Figure 19A:
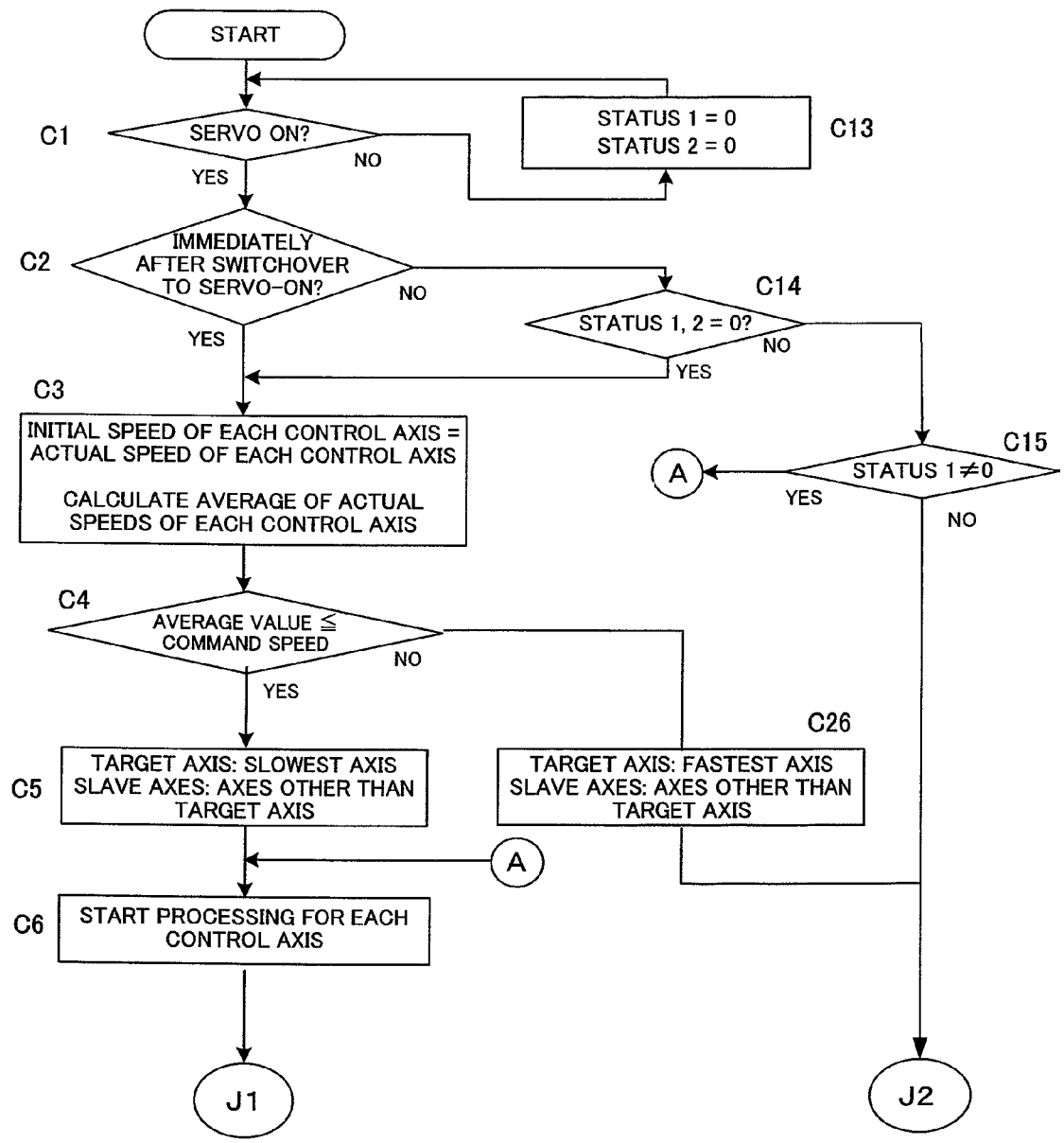
FIG. 19A is a flowchart illustrating an algorithm for initial speed setting and acceleration/deceleration control in the embodiment of the present invention.
Figure 19B:
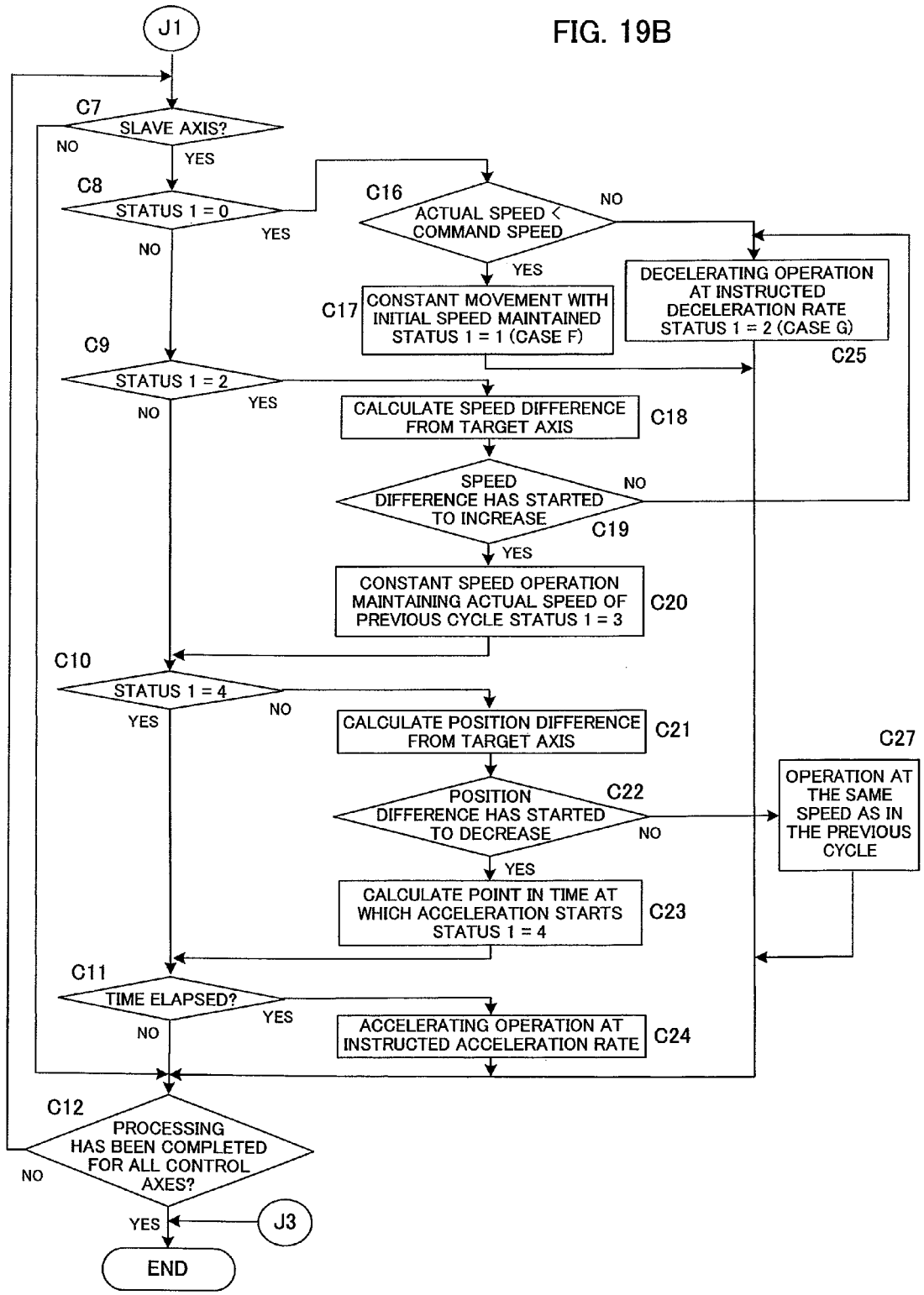
FIG. 19B is a flowchart continued from the flowchart in FIG. 19A, illustrating the processing for moving a slave axis at the deceleration rate specified in move commands.
Figure 19C:
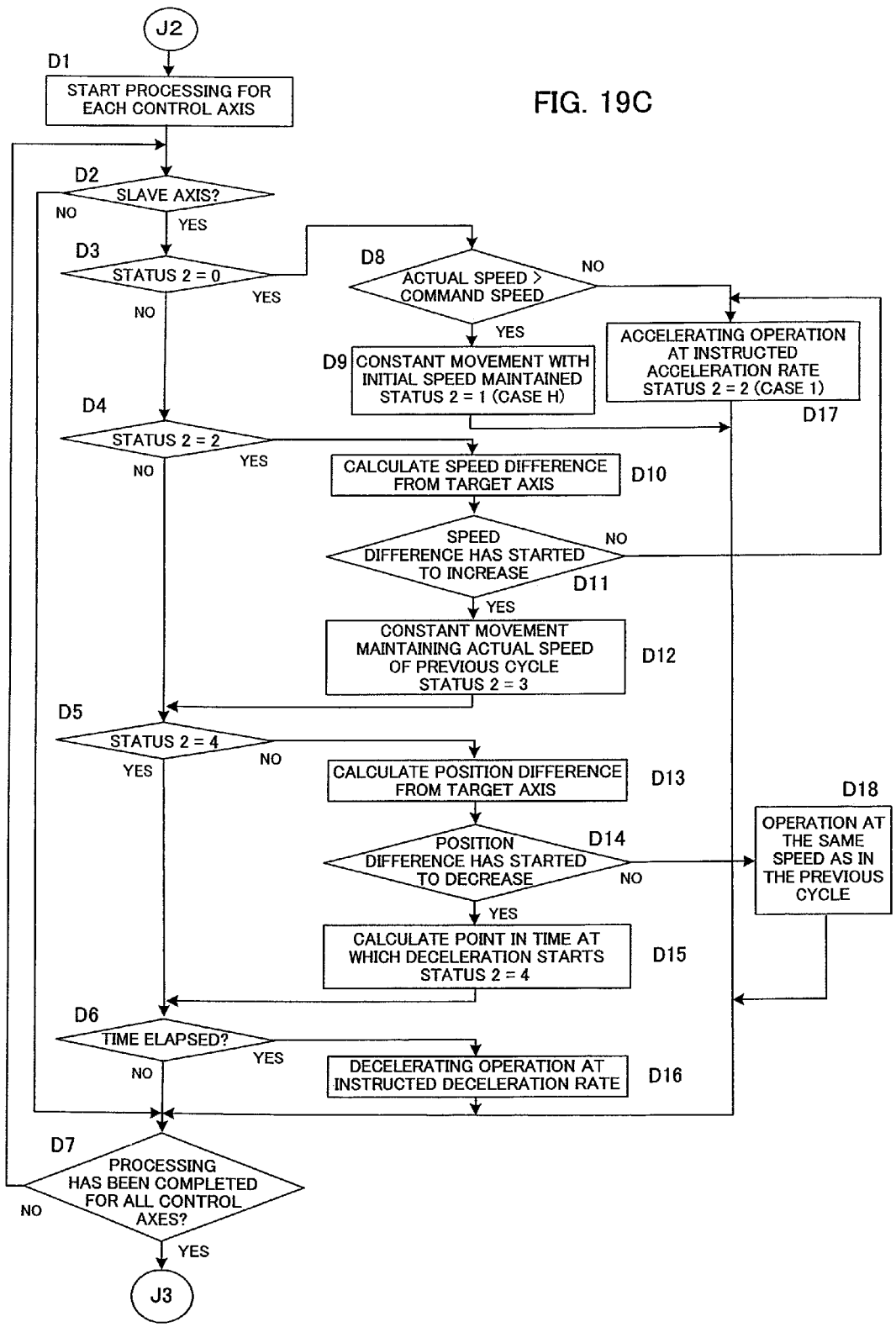
FIG. 19C is a flowchart continued from the flowchart in FIG. 19A, illustrating the processing for moving the slave axis at the acceleration rate specified in move commands.
Figure 20:
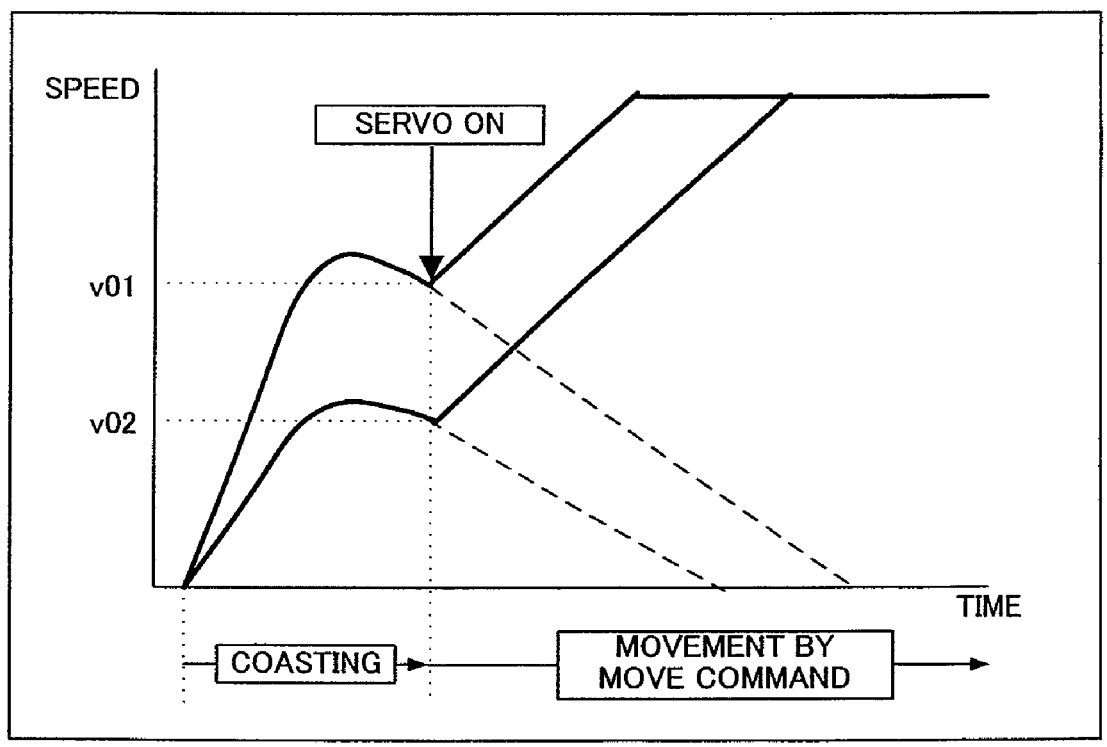
FIG. 20 shows an example of prior art in which the actual speeds of control axes are used as the initial speeds and identical move commands are subsequently issued.

FIGS. 19A to 19C are flowcharts illustrating an algorithm for initial speed setting and acceleration and deceleration control performed by the numerical controller of the present invention.

First, as shown in FIG. 19A, it is checked whether the servomotor is in the servo-on state (step C1); if not, status 1 is set to '0' and status 2 is set to '0' (step C13). If in the servo-on state, on the other hand, it is checked whether it is a servo-on state immediately after switchover from the servo-off state (step C2); if so, an average value of the actual speeds of the control axes is calculated using the initial speeds of the control axes as the actual speeds of the control axes (step C3). Next, it is checked whether the average value calculated in step C3 is equal to or less than the speed specified in the move command (step C4). If the average value is determined to be equal to or less than the instructed speed, the slowest axis is set as the target axis, the other axes are set as the slave axes (step C5), and the processing shown in FIG. 19B is performed. If the average value is determined to be greater than the instructed speed, on the other hand, the fastest axis is set as the target axis, the other axes are set as the slave axes (step C26), and the processing shown in FIG. 19C is performed.

FIG. 19B is a flowchart illustrating the processing for decelerating the slave axes at the deceleration rate specified in the move command.

The processing for each control axis is initiated and it is checked whether the control axis to be processed is the slave axis (step C7). If so, it is then checked whether the status 1 is '0', '2', or '4' (steps C8, C9, and C10).

If the status 1 is determined to be '0' (step C8), it is checked whether the actual speed is less than the speed specified in the move command (step C16). If so, a constant speed operation is performed maintaining the initial speed and the status 1 is set to '1' (step C17). Then, control proceeds to step C12. On the other hand, if the actual speed is determined to be greater than the speed specified in the move command in step C16, a deceleration operation is performed at the deceleration rate specified in the move command and the status 1 is set to '2' (step C25). Then, control proceeds to step C12.

If the status 1 is determined to be '2' (step C9), a difference in speed from the target axis is calculated (step C18). It is checked whether the difference in speed has started to increase (step C19). If determination result in step C19 is NO, control proceeds to step C25. If determination result in step C19 is YES, on the other hand, a constant speed operation is performed maintaining the actual speed of the previous cycle and the status 1 is set to '3' (step C20). Then, control proceeds to step C10.

If the status 1 is determined to be '4' (step C10), it is checked whether the predetermined time has elapsed (step C11); if not, it is then checked whether the processing has been completed for all the control axes (step C12). If not, control returns to step C7.

If determination result in step C2 is NO, it is then checked whether both statuses 1 and 2 are '0' (step C14). If both statuses 1 and 2 are determined to be '0', control proceeds to step C3. If either one of the statuses 1 and 2 is not determined to be '0', it is then checked whether the status 1 is '0' (step C15). If the status 1 is not '0', the processing in step C6 is performed. If the status 1 is determined to be '0', on the other hand, processing shown in FIG. 19C is performed.

If the status 1 is not determined to be '4' in step C10, the difference in position from the target axis is calculated (step C21), and it is checked whether the difference in position has started to decrease (step C22). If determination result in step C22 is YES, the point in time at which acceleration is initiated is calculated and the status 1 is set to '4' (step C23). If determination result in step C22 is NO, on the other hand, the control axes are moved at the same speed as in the previous cycle (step C 27) and control proceeds to step C12. It is checked whether the predetermined time has elapsed in step C11. If so, an acceleration operation is performed at the acceleration rate specified in the move command (step C24), and control proceeds to step C12. If determination result in step C11 is NO, on the other hand, it is checked whether the processing has been completed for all the control axes (step C12). If determination result in step C12 is YES, the processing ends. If determination result in step C12 is NO, on the other hand, control returns to step C7. If determination result in both steps C14 and C15 is NO, the processing shown in FIG. 19C is performed.

FIG. 19C is a flowchart illustrating the processing for accelerating the slave axes at the acceleration rate specified in the move command.

The processing for each control axis is initiated (step D1) and it is checked whether the control axis to be processed is the slave axis (step D2). If determination result in step D2 is YES, it is then checked whether the status 2 is '0', '2', or '4' (steps D3, D4, and D5).

If the status 2 is determined to be '0' (step D3), it is then checked whether the actual speed is greater than the speed specified in the move command (step D8). If determination result in step D8 is YES, the constant speed operation is performed maintaining the initial speed and the status 2 is set to '1' (step D9). If determination result in step D8 is NO, on the other hand, an acceleration operation is performed at the acceleration rate specified in the move command, the status 2 is set to '2' (step D17), and control proceeds to step D7.

If the status 2 is determined to be '2' (step D4), the difference in speed from the target axis is calculated (step D10), and it is checked whether the difference in speed has started to increase (step D11). If determination result in step D11 is NO, control proceeds to step D17. If determination result in step D11 is YES, on the other hand, the constant speed operation is performed maintaining the actual speed of the previous cycle and the status 2 is set to '3' (step D12).

If the status 2 is not determined to be '4' (step D5), the difference in position from the target axis is calculated (step D13), and it is checked whether the difference in position has started to decrease (step D14). If determination result in D14 is YES, the time at which deceleration is initiated is calculated and the status 2 is set to '4' (step D15). If determination result in D14 is NO, on the other hand, the control axes are moved at the same speed as in the previous cycle (step D18) and control proceeds to step D7.

It is checked whether the predetermined time has elapsed in step D6. If determination result in step D6 is YES, a deceleration operation is performed at the deceleration rate specified in the move command (step D16), and control proceeds to step D7. If it is determined that the processing has not been completed for all the control axes in step D7, control returns to step D2.

The invention claimed is:

1. A numerical controller for synchronously operating a plurality of servomotors connected, the numerical controller comprising:
    actual speed detecting means for detecting an actual speed of a specified control axis at the point in time at which the servomotors are switched from a first state in which current is not supplied to the servomotors to a second state in which current is supplied to the servomotors;
    initial speed setting means for setting the actual speed detected by the actual speed detecting means as a common initial speed in move commands for control axes controllably driven by the servomotors; and
    acceleration and deceleration controlling means for controlling acceleration and deceleration of the control axes up to speeds specified in the move commands with the initial speed set by the initial speed setting means.

2. A numerical controller for synchronously operating a plurality of servomotors connected, the numerical controller comprising:

actual speed detecting means for detecting actual speeds of control axes controllably driven by the servomotors at the point in time at which the servomotors are switched from a first state in which current is not supplied to the servomotors to a second state in which current is supplied to the servomotors;

initial speed setting means for setting a common initial speed in move commands for the control axes on the basis of the actual speeds detected by the actual speed detecting means and the speeds specified in the move commands after the servomotors are switched to the second state; and acceleration and deceleration controlling means for controlling acceleration and deceleration of the control axes up to the speeds specified in the move commands with the initial speed set by the initial speed setting means.

3. A numerical controller for synchronously operate a plurality of servomotors connected, the numerical controller comprising:

actual speed detecting means for detecting actual speeds of control axes controllably driven by the servomotors at the point in time at which the servomotors are switched from a first state in which current is not supplied to the servomotors to a second state in which current is supplied to the servomotors;

initial speed setting means for setting, as a common initial speed in move commands for the control axes, an intermediate speed between the maximum and minimum actual speeds detected by the actual speed detecting means; and acceleration and deceleration controlling means for controlling acceleration and deceleration of the control axes up to speeds specified in the move commands with the initial speed set by the initial speed setting means.

4. The numerical controller according to claim 3, wherein the initial speed setting means sets an average value between the maximum and minimum speeds detected by the actual speed detecting means as a common initial speed in the move commands for the control axes.

5. The numerical controller according to claim 3, wherein the initial speed setting means sets an average value of the actual speeds of the respective control axes, detected by the actual speed detecting means, as a common initial speed in the move commands for the control axes.

6. A numerical controller for synchronously operate a plurality of servomotors connected, the numerical controller comprising:

actual speed detecting means for detecting actual speeds of control axes controllably driven by the servomotors at the point in time at which the servomotors are switched from a first state in which current is not supplied to the servomotors to a second state in which current is supplied to the servomotors;

initial speed setting means for setting the actual speeds detected by the actual speed detecting means as initial speeds in move commands for the control axes;

target axis selecting means for selecting a target axis from among the control axes according to a comparative relationship between the actual speeds detected by the actual speed detecting means and the speeds specified in the move commands after the servomotors are switched to the second state; and acceleration and deceleration controlling means for controlling acceleration and deceleration of the control axes not selected by the target axis selecting means to attain the position and speed of the target axis at an acceleration or deceleration rate specified in the move command;

wherein differences in position and speed among the control axes are gradually decreased as the move commands are executed after the servomotors are switched from a first state in which current is not supplied to the servomotors to a second state in which current is supplied to the servomotors.

7. The numerical controller according to claim 6, wherein the target axis selecting means selects the target axis on the basis of a result of comparing the speeds specified in the move commands with the average value of the actual speeds of the control axes at the time in which the servomotors are switched from the first state to the second state.

* * * * *